(12) United States Patent
Beierman et al.

(10) Patent No.: US 6,340,044 B1
(45) Date of Patent: Jan. 22, 2002

(54) METHOD AND APPARATUS FOR THE MANUFACTURE OF BEVELED EDGE MOLDING

(75) Inventors: Dennis M. Beierman, Belton; John K. Hubbard, Moody, both of TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 0 days.

(21) Appl. No.: 09/317,203

(22) Filed: May 24, 1999

(51) Int. Cl.[7] .............................. E04C 2/00; A47F 9/00
(52) U.S. Cl. ...................... 156/443; 156/443; 156/512; 156/518; 83/13; 52/631; 312/140.3
(58) Field of Search ................................ 156/443, 512, 156/518, 578; 83/13; 52/631; 312/140.3

(56) References Cited

U.S. PATENT DOCUMENTS

| | | | |
|---|---|---|---|
| 3,606,508 A | * | 9/1971 | Burnes |
| 5,826,396 A | | 10/1998 | Michaels ..................... 52/631 |
| 5,979,038 A | * | 11/1999 | Nelson et al. ................ 29/563 |

FOREIGN PATENT DOCUMENTS

| | | |
|---|---|---|
| DE | 2234902 | 1/1974 |
| EP | 458242 | 11/1991 |
| EP | 894565 | 2/1999 |
| WO | 93/04816 | 3/1993 |

* cited by examiner

Primary Examiner—Mark A. Osele
Assistant Examiner—Sue A. Purvis
(74) Attorney, Agent, or Firm—Welsh & Flaxman LLC

(57) ABSTRACT

A system for the fabrication of molding from stock material is disclosed. The system includes a groove cutting assembly for cutting a groove of predetermined shape and size in stock material to define a facing member and bevel member, wherein the groove is positioned between the facing member and the bevel member to define respectively opposed surfaces on the facing member and the bevel member. The system also includes an adhesive application station for applying adhesive within the groove formed by the groove cutting assembly and a folding station for bringing the opposed surfaces of the facing member and the bevel member together. The system further includes a conveyor moving the stock material through the system.

32 Claims, 14 Drawing Sheets

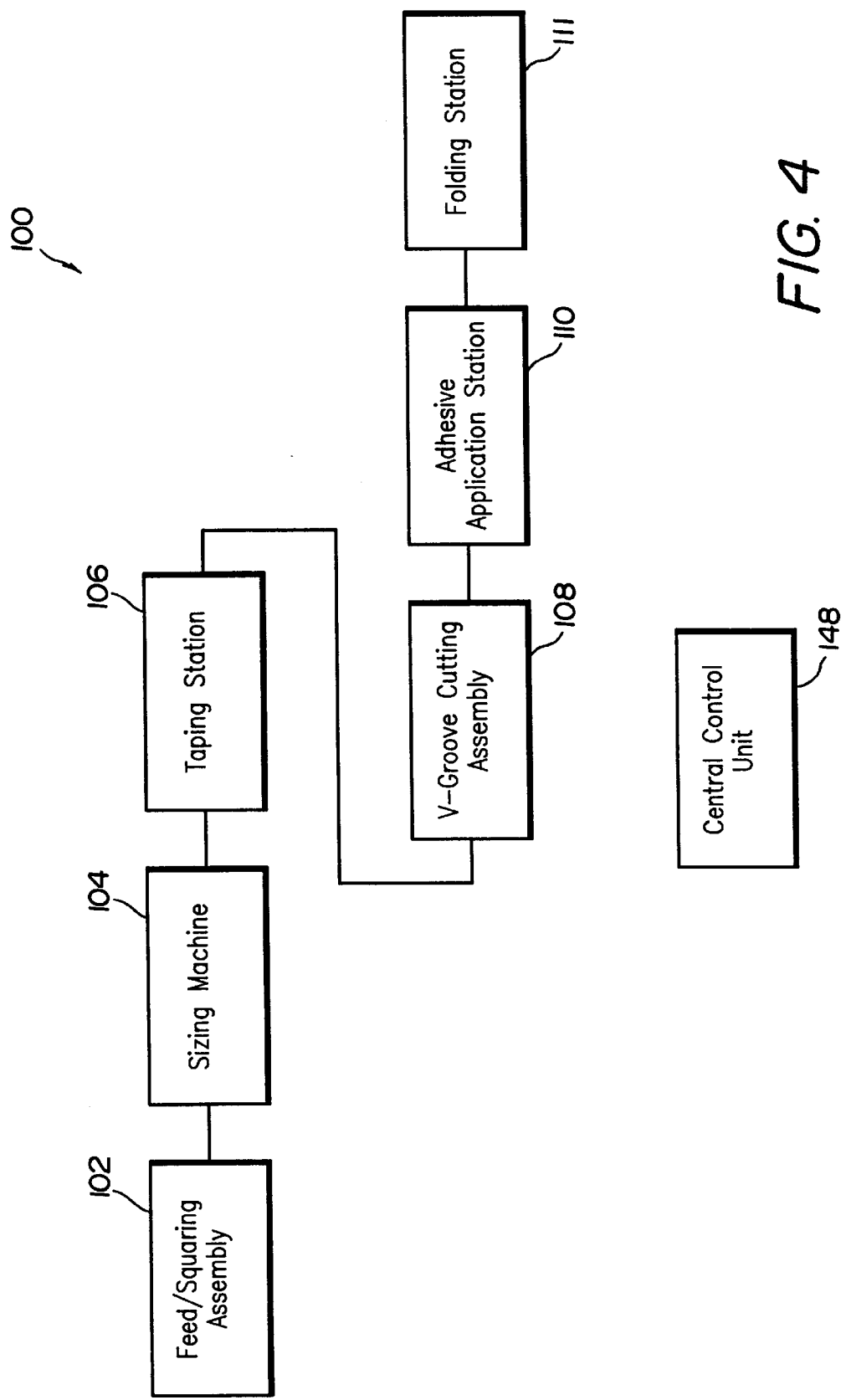

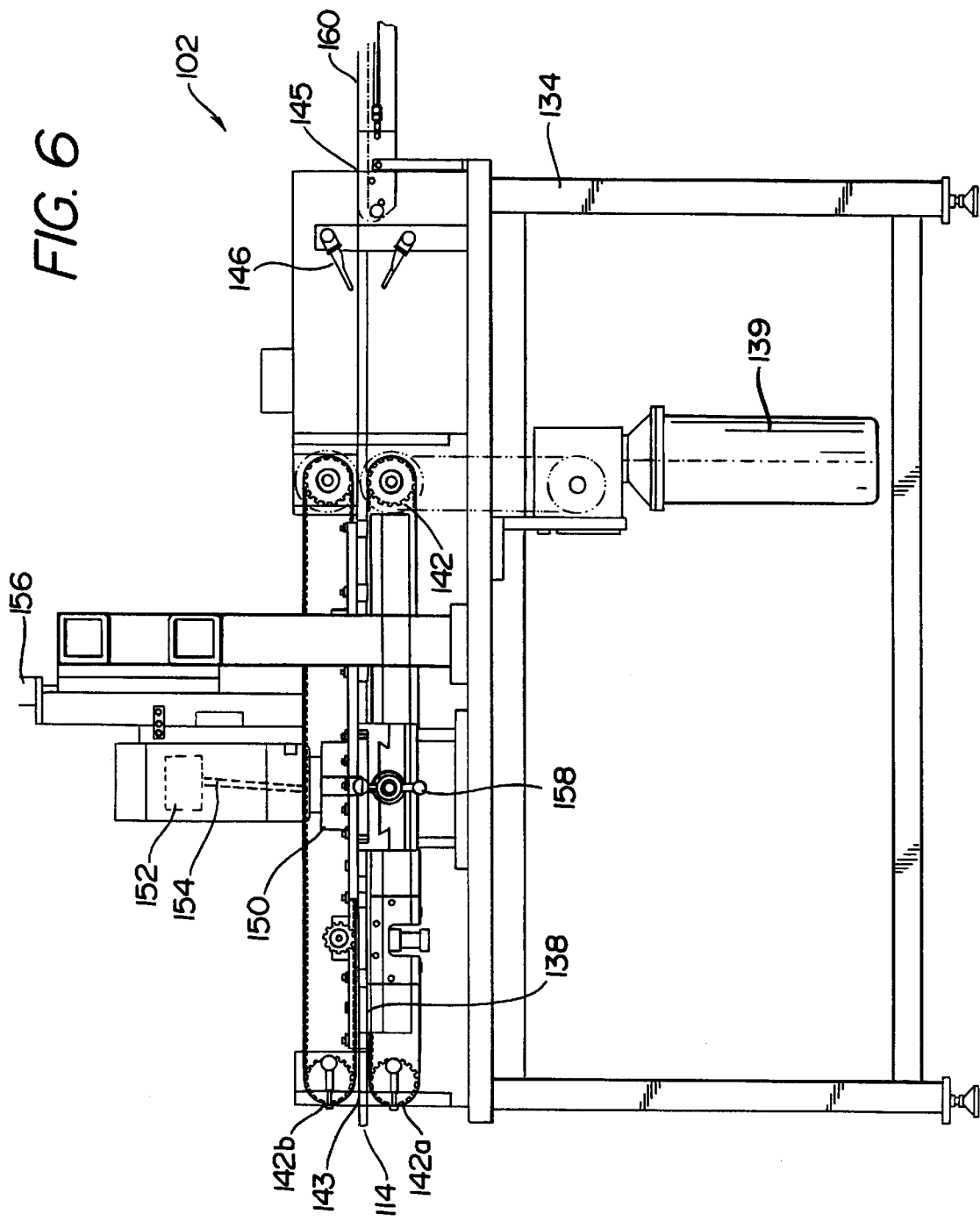

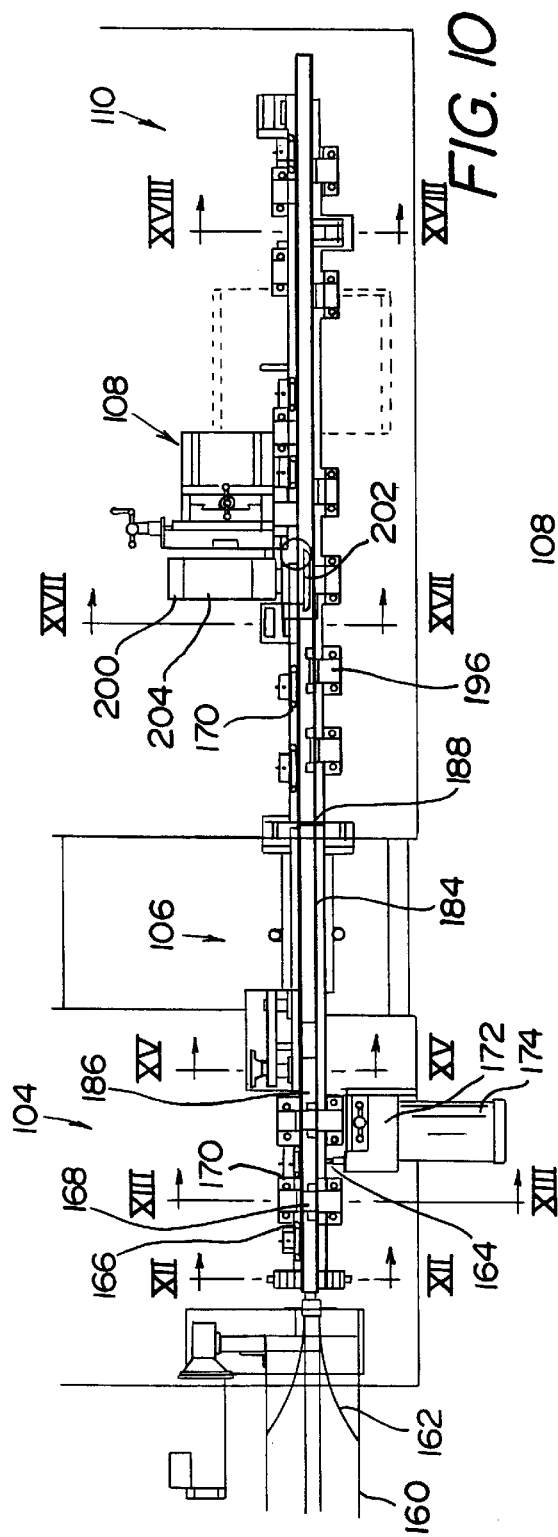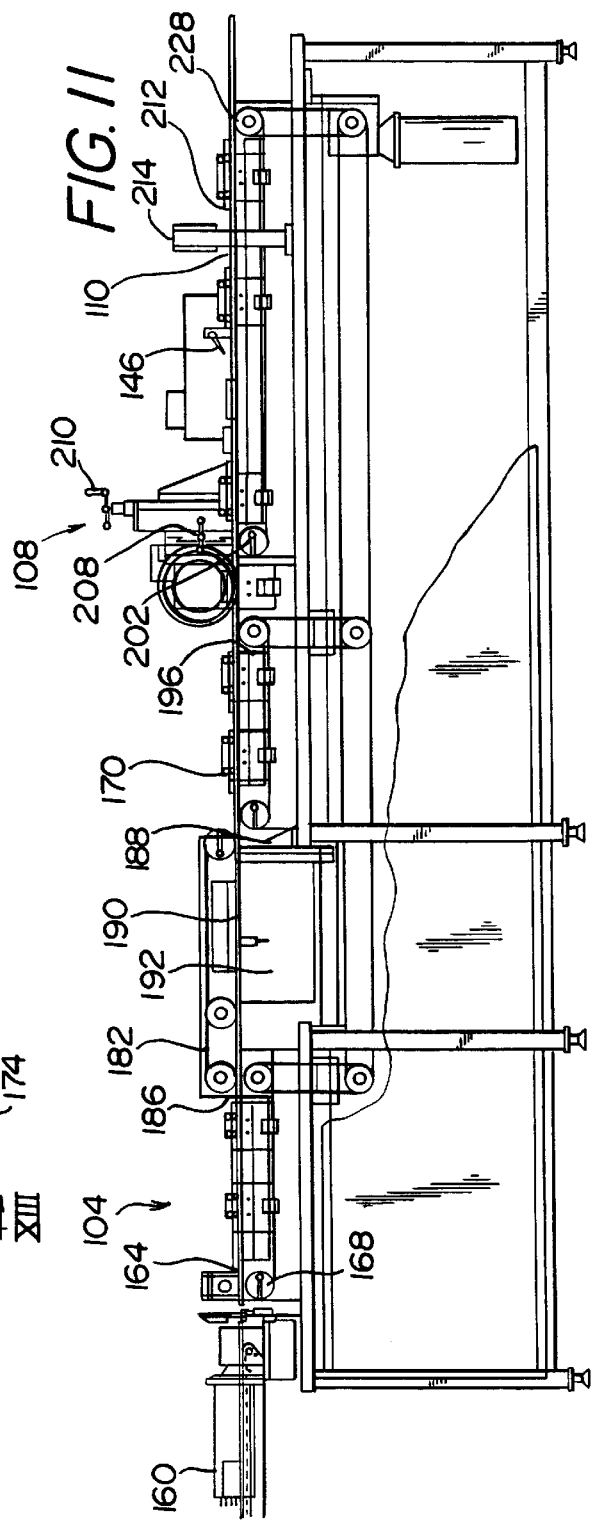

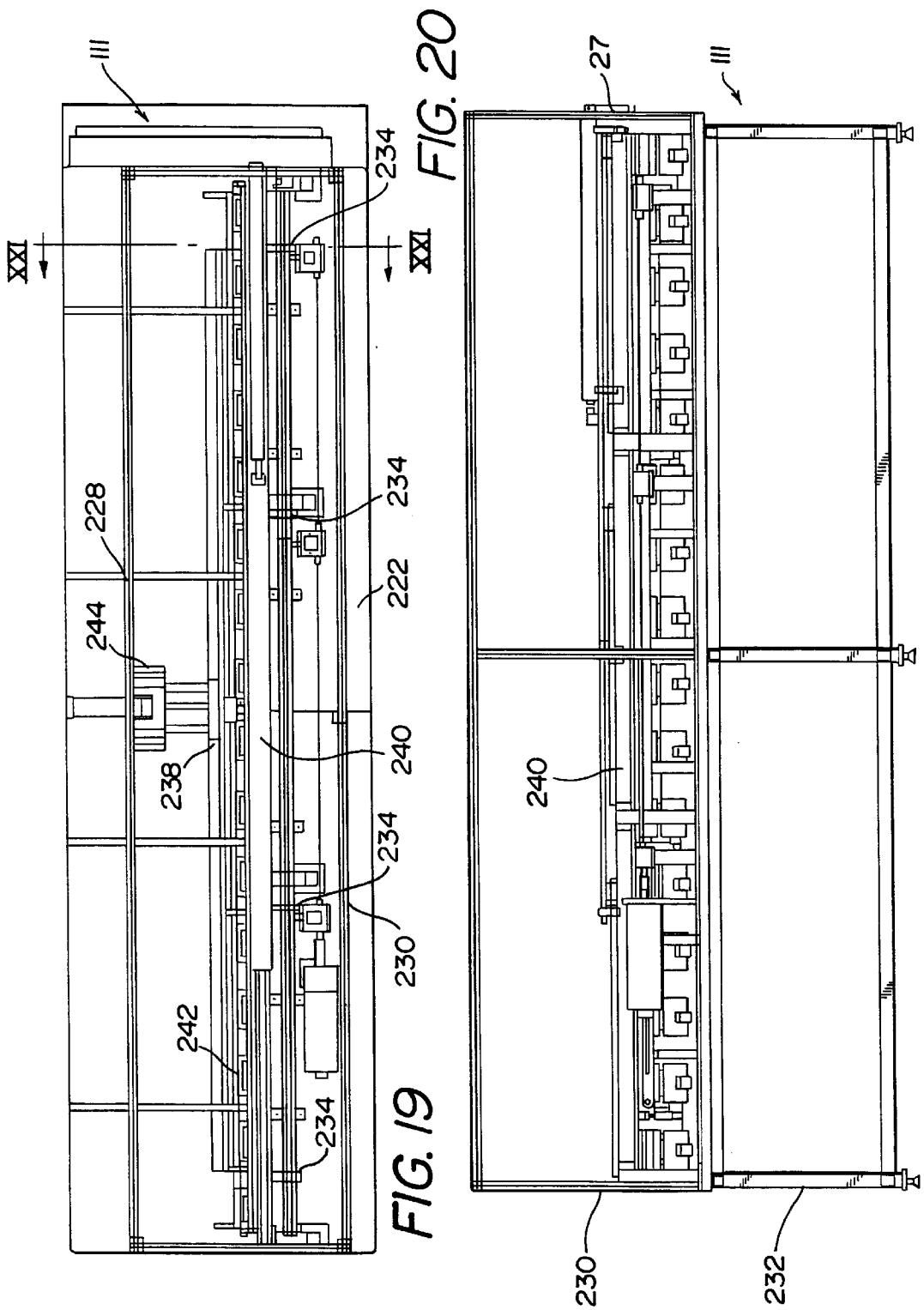

METHOD AND APPARATUS FOR THE MANUFACTURE OF BEVELED EDGE MOLDING

BACKGROUND OF THE INVENTION

1. Field of the Invention

The invention relates to an automated process for the manufacture of molding. More particularly, the invention relates to an automated process for the manufacture of beveled molding used along the front edge of countertops, as well as the molding manufactured in accordance with the present process.

2. Description of the Prior Art

With reference to FIGS. 1a, 1b, and 1c, standard beveled molding 10a, 10b, 10c used in the manufacture of countertops 11 is disclosed. The molding 10a–c provides an aesthetically pleasing alternative to conventional square edges commonly employed as a finish on countertops. Other, more elaborate, moldings are available, however, those shown in FIGS. 1a, 1b, and 1c account for approximately 90% of upgraded moldings currently sold within the United States.

Prior to the development of the present system, beveled moldings have been manufactured in a highly labor intensive manner. Specifically, and with reference to FIGS. 2 and 3, the fabrication begins with a facing member 12 and a bevel member 14. Both members begin with a substantially rectangular cross section; as such, the facing member 12 includes a top surface 16, a bottom surface 18, a front decorative surface 20 and a backside 22, while the bevel member 14 also includes a top surface 24, a bottom surface 26, a front decorative surface 28 and a backside 30. The facing member 12 is then cut with a 45° angle along its top surface 16 as shown in FIG. 3 to produce an angled top surface 32. The cut is generally made using conventional cutting equipment.

Adhesive is then applied along the angled upper edge 32 in preparation for the attachment of the bevel member 14 thereto. The bottom surface 26 of the bevel member 14 is then secured to the angled top surface 32 of the facing member 12 such that the decorative surface 20 of the facing member 12 substantially aligns with the decorative surface 28 of the bevel member 14. Once the bevel member 14 and facing member 12 are properly aligned, the assembly is clamped and the adhesive is permitted to set.

After the adhesive has thoroughly set, the rearwardly extending portion 34 of the bevel member 14 (see FIG. 1) is cut off to align the backside 30 of the bevel member 14 with the backside 32 of the facing member 12. At this point, the molding is complete and ready for installation as the fabricator sees fit.

As those skilled in the art will readily appreciate, the process outlined above is highly labor intensive and very time consuming. With this in mind, a more convenient system for the assembly of beveled molding products is needed. The present invention provides such a system.

SUMMARY OF THE INVENTION

It is, therefore, an object of the present invention to provide a system for the fabrication of molding from stock material. The system includes a groove cutting assembly for cutting a groove of predetermined shape and size in stock material to define a facing member and bevel member, wherein the groove is positioned between the facing member and the bevel member to define respectively opposed surfaces on the facing member and the bevel member. The system also includes an adhesive application station for applying adhesive within the groove formed by the groove cutting assembly and a folding station for bringing the opposed surfaces of the facing member and the bevel member together. The system further includes means for conveying the stock material through the system.

It is also an object of the present invention to provide a method for the fabrication of molding. The method is accomplished by preparing a molding preform from stock material, conveying the molding preform to a groove cutting assembly, cutting a groove in the molding preform to define a facing member and a bevel member, conveying the molding preform to an adhesive application station, applying adhesive within the groove formed by the groove cutting assembly, conveying the molding preform to a folding station and folding the molding preform to bring the opposed surfaces of the facing member and the bevel member together.

It is a further object of the present invention to provide a beveled molding fabricated in accordance with the method outlined above.

It is another object of the present invention to provide a folding station for bringing opposed stock materials together. The folding station includes an inlet for receiving the opposed stock materials and an outlet for retrieving the stock materials after they have been brought together within the folding station. The folding station also includes a plurality of support arms shaped and dimensioned to receive the opposed stock materials as they enter the folding station. The support arms are coupled to a drive assembly which moves the support arms between a receiving position and a delivery position. A folding support is also provided upon which the support arms transfer the opposed stock materials when the support arms are moved to their delivery position. Finally, the folding station includes a press assembly positioned adjacent the folding support such that the press assembly may selectively apply pressure to opposed stock materials sitting upon the folding support to bring the opposed stock materials together in a predetermined manner.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 4 is a schematic of the present system.

FIG. 6 is a front view of the feed/squaring assembly in accordance with the present invention.

FIG. 10 is a top plan view of the guiding conveyor, sizing machine, taping station, V-groove cutting assembly and adhesive application station.

FIG. 11 is a front view of the assembly disclosed in FIG. 10.

FIG. 19 is a top plan view of the folding station.

FIG. 20 is a front view of the folding station.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIG. 4, a schematic of the automated system 100 for fabricating beveled molding is disclosed. The system 100 employs a plurality of stations integrated to continuously assemble beveled molding with a high degree of precision. While the assembly of beveled molding is discussed throughout the body of the present specification, it is contemplated that the teachings of the present invention may be applied in the fabrication of various moldings without departing from the spirit of the invention. The system has been primarily designed for use in fabricating moldings from standard MDF (medium density fiberboard) decorative laminates and/or solid surfacing materials, although other materials may be employed without departing from the spirit of the present invention.

Figure 1C:
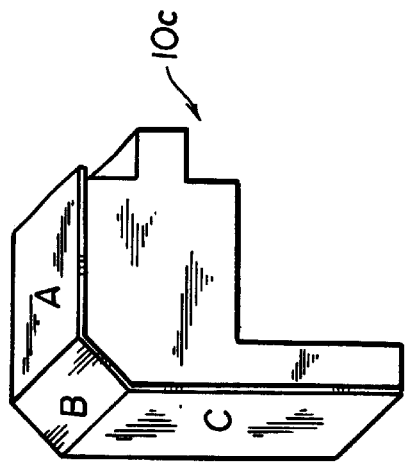
FIGS. 1a, 1b and 1c are perspective views of various prior art beveled moldings.
Figure 1B:
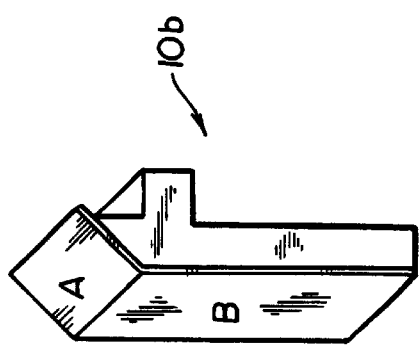
Figure 1A:
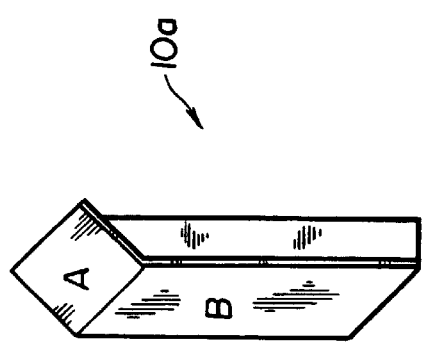
Figure 5:
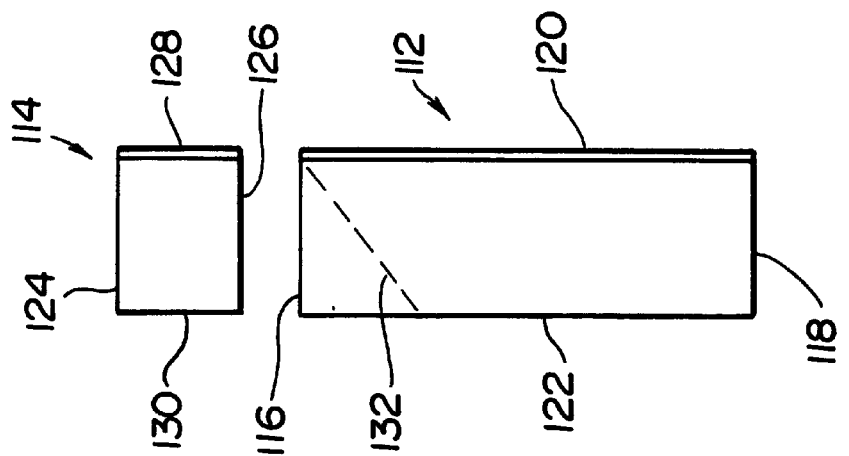
FIG. 5 is a side view of a facing member and bevel member in accordance with the present invention.
Figure 3:
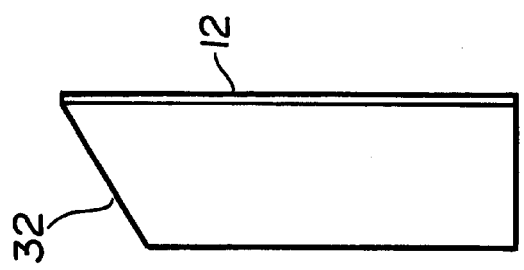
FIG. 3 is a side view of a facing member after the top portion thereof has been removed.
Figure 2:
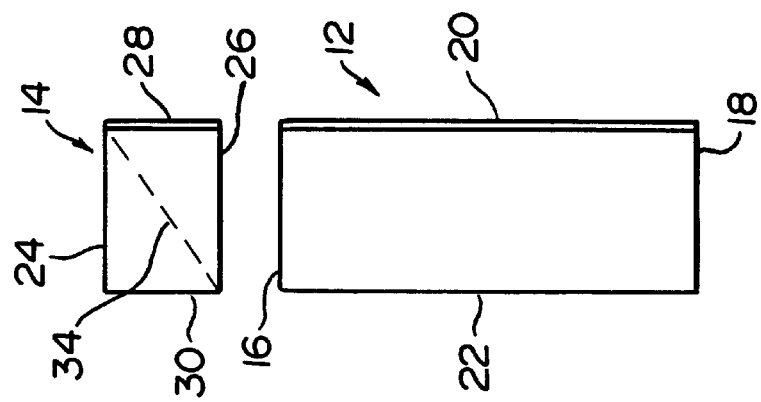
FIG. 2 is a side view of a facing member and bevel member 5 used in the fabrication of prior art beveled molding.
Figure 7:
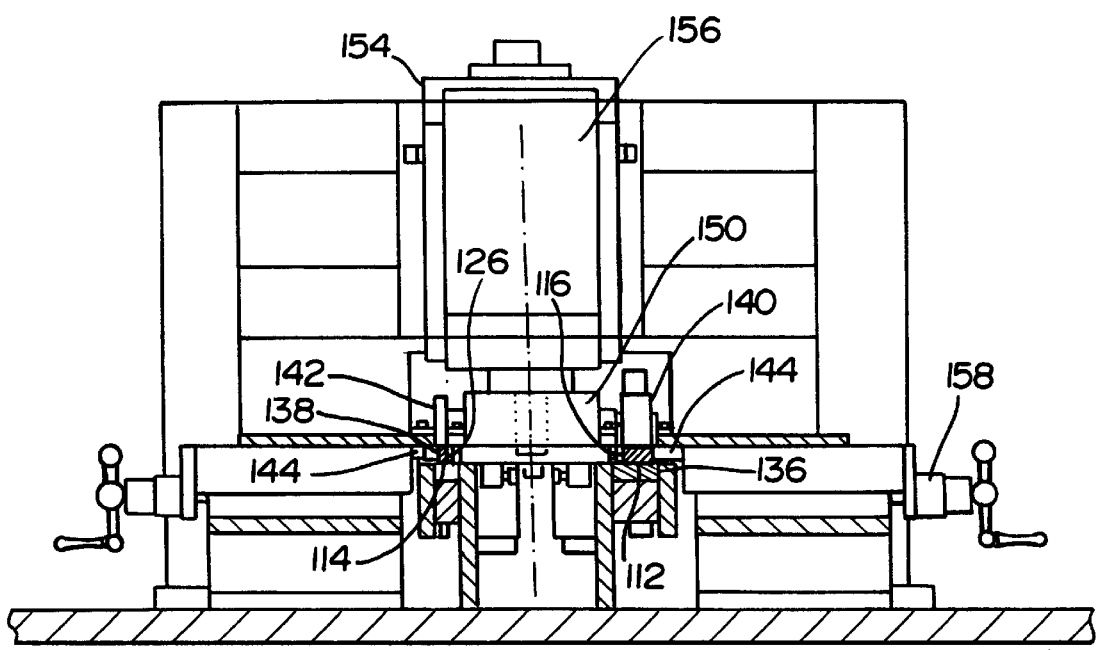
FIG. 7 is a cross-sectional view along the line VII—VII in FIG. 9.
Figure 8:
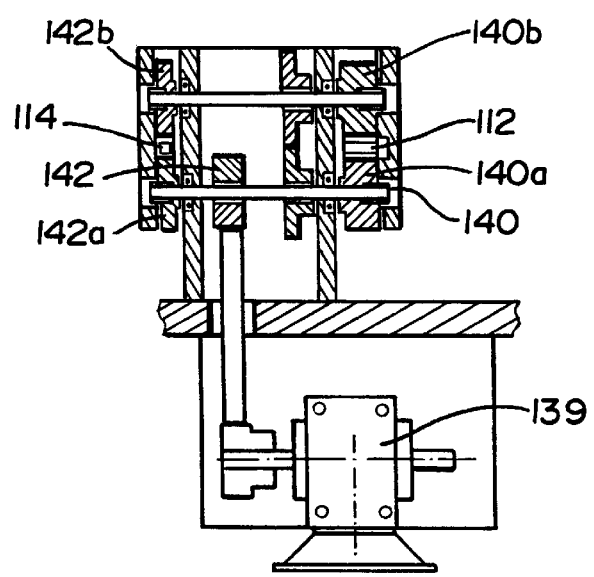
FIG. 8 is a cross-sectional view along the line VIII—VIII in FIG. 9.
Figure 9:
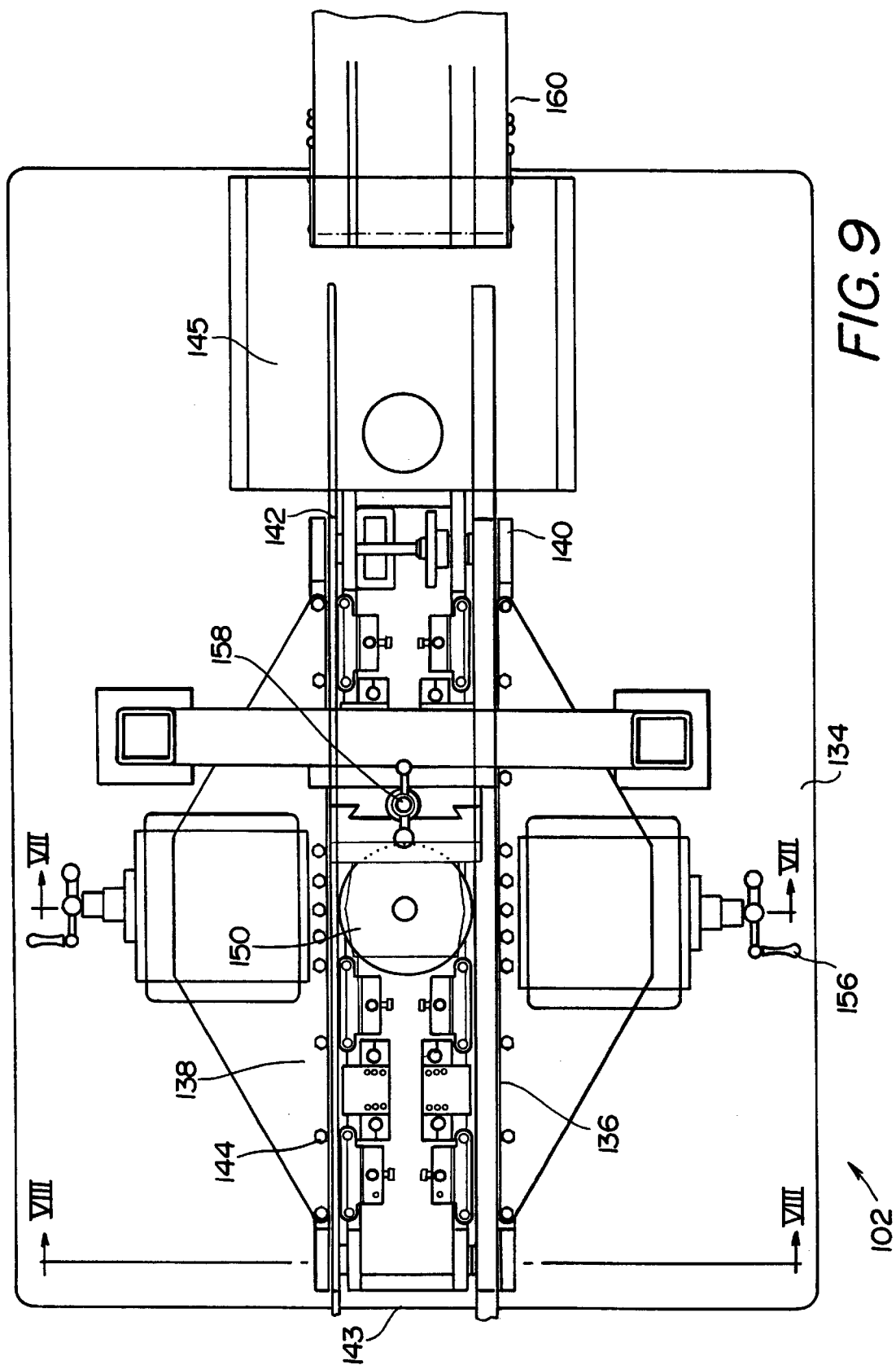
FIG. 9 is a top plan view of the feed/squaring assembly.
Figure 12:
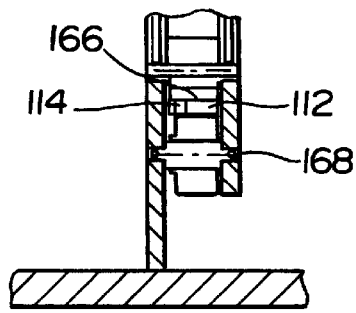
FIG. 12 is a cross-sectional view along the line XII—XII in FIG. 10.
Figure 13:
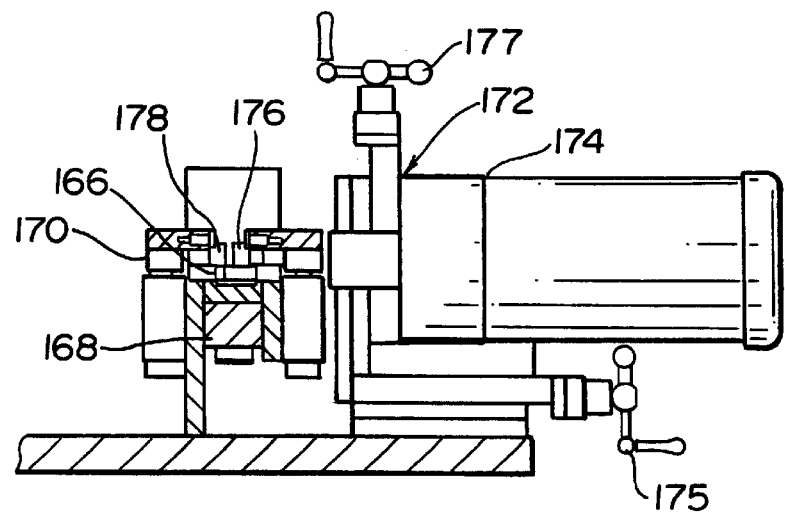
FIG. 13 is a cross-sectional view along the line XIII—XIII in FIG. 10.

Briefly, the present system is composed of a feed/squaring assembly 102, a sizing machine 104, a taping station 106, a V-groove cutting assembly 108, an adhesive application station 110 and a folding station 111. With this in mind, and with reference to FIG. 5, a facing member 112 and a bevel member 114 (a single piece may also be used in accordance with the present invention as discussed below in greater detail) are inserted within the feed/squaring assembly 102 to begin the fabrication process. The facing and bevel members 112, 114 are commonly 12 feet in length, although materials of other lengths may be used without departing from the spirit of the present invention.

The facing and bevel members 112, 114 are then cut by a single cutting element to square the respective top and bottom surfaces 116, 126 of the facing member 112 and the bevel member 114. Squaring in this way helps to ensure an ideal fit for the final product. The facing and bevel members 112, 114 are then brought together along the top surface 116 of the facing member 112 and the bottom surface 126 of the bevel member 114.

At this time, the facing and bevel members 112, 114 are conveyed to a sizing machine 104 where the members are trimmed to a standard, and equal, width. Once the members are properly sized, they are conveyed to the taping station 106 where the bevel member 114 and the facing member 112 are taped together along the seam which will ultimately join the decorative surface 120 of the facing member 112 with the decorative surface 128 of the bevel member 114.

The joined members are then conveyed to a V-groove cutting assembly 108 where a 45° cut is made in the facing member 112 adjacent its top surface 116 which faces the bottom surface 126 of the bevel member 114. The joined and cut members are then conveyed to the adhesive application station 110, and ultimately to the folding station 111.

When the joined members reach the folding station 111, the bevel member 114 is rotated onto the angled top surface 132 of the facing member 112. The members are then held together and hot glue is applied along the joint to temporarily clamp the members together while the previously applied adhesive sets. The assembled piece of beveled molding is then released.

With reference to FIGS. 6–9, the feed/squaring assembly 102 is disclosed. The feed assembly is integrated with the squaring assembly in accordance with the preferred embodiment of the present invention. However, as those skilled in the art will readily appreciate, the feed and squaring assemblies may be formed as separate components without departing from the spirit of the present invention.

The feed/squaring assembly 102 includes a housing 134 with two distinct passageways formed therein. Specifically, the housing 134 includes a facing member passageway 136 through which the facing member 112 is conveyed and a bevel member passageway 138 through which the bevel member 114 is conveyed.

The facing and bevel members 112, 114 are respectfully conveyed through the facing member passageway 136 and the bevel member passageway 138 on controlled conveyers powered by a conventional motor system 139. The facing member 112 is conveyed on the facing member conveyor 140 and the bevel member 114 is conveyed on the bevel member conveyor 142. The conveyors 140, 142 are composed of upper belts 140a and lower belts 140b which act upon the members to maintain complete control.

Positioning of the facing member 112 and the bevel member 114 on the respective conveyors is controlled by a series of guide rollers 144 positioned alongside both the facing member conveyor 140 and the bevel member conveyor 142. As those skilled in the art will readily appreciate, the positioning of the rollers 144 may be adjusted to accommodate bevel members and facing members of varying sizes.

The facing member conveyor 140 and the bevel member conveyor 142 respectively extend from the inlet 143 of the feed/squaring assembly 102 to the outlet 145 of the feed/squaring assembly 102, and move the facing and bevel members 112, 114 through the feed/squaring assembly 102 in a highly controlled manner. In fact, movement of the bevel member 114 and the facing member 112 through the feed/squaring assembly 102 is controlled by a variety of sensors 146 integrated with a central control unit 148 to monitor and control the entire system 100.

The facing member and bevel member conveyors 140, 142 respectively draw the facing member 112 and the bevel member 114 into the housing 134 and subsequently move them past opposite sides of a rotary cutting element 150 housed within the feed/squaring assembly 102. In practice, the facing member 112 and the bevel member 114 are fed into the housing 134 such that the top surface 116 of the facing member 112 and the bottom surface 126 of the bevel member 114 are opposed. The cutting element 150 acts upon the top surface 116 of the facing member 112 and the bottom surface 126 of the bevel member 114 to square these surfaces for further processing. Squaring of the surfaces in this way ensures that the bevel member 114 and the facing member 112 are later combined in an ideal manner to produce an aesthetically appealing beveled molding.

The cutting element 150 is a substantially cylindrical member with a plurality of outwardly extending blades shaped and dimensioned to engage the respective surfaces of the facing and bevel members 112, 114 as they pass thereby. The cutting element 150 is powered by a motor 152 supported with a cutting housing 154. The cutting housing 154 includes a horizontal adjustment mechanism 156 and a vertical adjustment mechanism 158 permitting ready adjustment of the cutting element 150. Adjustments ensure proper squaring of the facing and bevel members 112, 114 as they pass through the feed/squaring assembly 102. With this in mind, those skilled in the art will appreciate the necessity for proper positioning of the cutting element 150 between the facing member passageway 136 and the bevel member passageway 138 for reliable and consistent squaring of the bevel member 114 and the facing member 112.

As discussed above, and with reference to FIG. 4, the squared facing and bevel members 112, 114 leave the feed/squaring assembly 102 and enter the sizing machine 104. Prior to entering the sizing machine, the facing member 112 and the bevel member 114 are brought together along their adjacent edges by a guiding conveyor 160.

The facing and bevel members 112, 114 respectively exit the feed/squaring assembly 102 with the top surface 116 of the facing member 112 opposite the bottom surface 126 of the bevel member 114. With reference to FIGS. 10 and 11, the facing member 112 and the bevel member 114 enter a guiding conveyor 160 including a funnel guide member 162 which moves the bevel member 114 and facing member 112 toward each other as they are drawn closer to the sizing machine 104. The facing member 112 and the bevel member 114 are drawn together until the top surface 116 of the facing member 112 is brought into contact with the bottom surface 126 of the bevel member 114. Once the facing member 112 and bevel member 114 are properly drawn together, they exit the guiding conveyor 160 and enter the sizing machine 104.

As those skilled in the art will readily appreciate, the facing and bevel members 112, 114 should have the same thickness to ensure an ideal finished product. Unfortunately, stock facing and bevel members used in accordance with the present invention may come in various thicknesses and may not result in the highest quality molding elements. The present system, therefore, includes a sizing machine 104 to ensure that the facing and bevel members 112, 114 are properly dimensioned for further processing.

The sizing machine 104 includes a housing 164 with a single passageway 166 shaped and dimensioned to accommodate the facing and bevel members 112, 114. The bevel member 114 and the facing member 112 are moved through the passageway 166 on a conveyor 168. Movement of the facing and bevel members 112, 114 through the sizing machine 104 is once again controlled by a series of sensors 146 which will be discussed in greater detail below.

As FIGS. 10 and 11 reveal, the sizing machine 104, taping assembly 106, V-groove cutting assembly 108 and adhesive application station 110 are formed as an integral unit. The conveyor 168 discussed above with regard to the sizing machine 104 is continuous through the entire unit. While breaks in the conveyor 168 are provided at appropriate points along the integral unit to facilitate the placement of specific machinery, the conveyor 168 should be considered a continuous unit for the purpose of the present invention. Proper positioning of the facing and bevel members 112, 114 along the conveyor 168 is ensured by placing a series of guide rollers 170 on opposite sides of the conveyor 168.

The conveyor 168 moves the facing and bevel members 112, 114 through the sizing machine 104, taping assembly 106, V-groove cutting assembly 108 and adhesive application station 110 under the control of the central control unit 148 (tied to a plurality of sensors discussed below in greater detail) which controls the operation of the present system 100. However, as those skilled in the art will readily appreciate, the various assemblies and stations may be formed as separate units without departing from the spirit of the present invention.

A sizing cutting assembly 172 is housed within the sizing machine 104 and is powered by a conventional motor 174 under the control of the central processing unit 148. The sizing cutting assembly 172 further include a horizontal adjustment mechanism 175 and a vertical adjustment mechanism 177. The sizing cutting assembly 172 includes a facing member cutting element 176 and a bevel member cutting element 178. The facing and bevel member cutting elements 176, 178 are conventional rotary cutting elements used in the fabrication of various materials, and a variety of different cutting elements may be used without departing from the spirit of the present invention. The facing and bevel member cutting elements 176, 178 trim material from the backside 130 of bevel member 114 and/or the backside 122 of the facing member 112 as necessary to provide facing and bevel members 112, 114 of an appropriate thickness for further processing.

Figure 14:
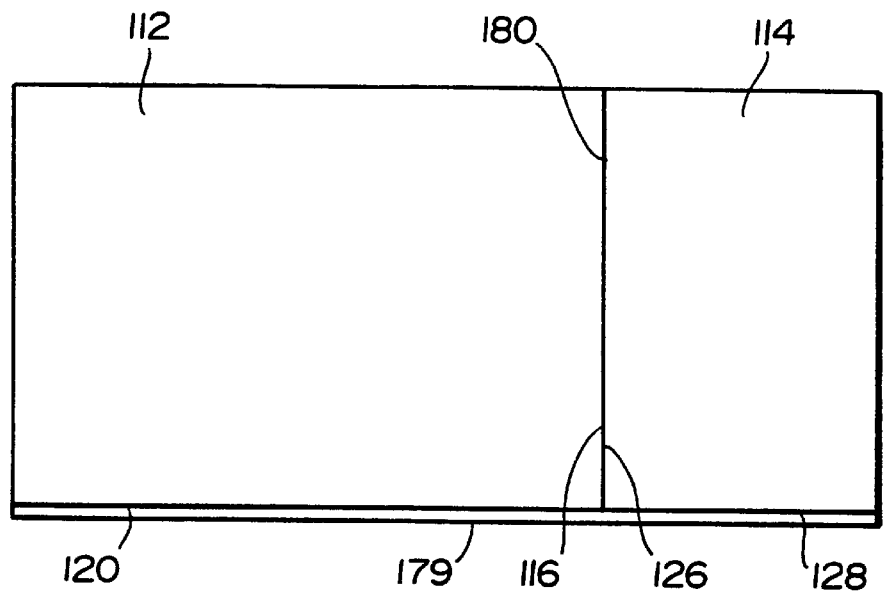
FIG. 14 is a cross-sectional view of a molding preform after the application of tape.

After exiting the sizing machine 104, the bevel member 114 and the facing member 112 are conveyed to the taping assembly 106 where tape 179 is applied to their decorative surfaces 120, 128 along the seam 180 separating the facing member 112 from the bevel member 114 (see FIG. 14). In accordance with the preferred embodiment of the present invention tape 179 is applied along the entire decorative surfaces 120, 128 of both the facing member 112 and the bevel member 114. As with the previously discussed components of the present system 100, the conveyor 168, with the help of an overhead drive assembly 182, simultaneously move both the bevel member 114 and the facing member 112 through the taping assembly 106.

Proper alignment of the bevel member 114 and the facing member 112 as they move through the taping assembly 106 is ensured by the series of sensors 146 and central processing unit 148 discussed above. In fact, the facing member 112 and the bevel member 114 are properly aligned upon entering the sizing machine 106 where they are driven simultaneously by the same conveyor 168. The sensors 146 coordinate the movement of the bevel member 114 and the facing member 112 such that they enter the taping assembly 106 at substantially the same time. In this way, longitudinal alignment of the bevel member 114 and the facing member 112 is ensured.

The taping assembly 106 includes a housing 184 having an inlet 186 and an outlet 188 linked by a passageway 190 extending though the taping assembly 106. An overhead drive assembly 182 is mounted within the taping assembly 106 to exert downward and forward pressure upon the facing and bevel members 112, 114 as they move past the tape applicator 192 applying tape 179 to the decorative surfaces 120, 128 of the facing and bevel members 112, 114.

Figure 15:
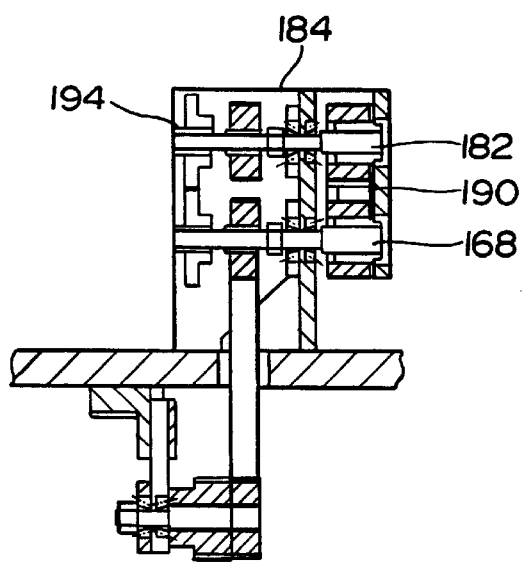
FIG. 15 is a cross-sectional view along the line XV—XV in FIG. 10.

Specifically, the overhead drive assembly 182 is synchronously driven with the conveyor 168 by linking gears 194 positioned between the conveyor 168 and the overhead drive assembly 182 (see FIG. 15). In this way, the facing member 112 and bevel member 114 are moved forward in a controlled manner while tape 179 is applied to the decorative surfaces 120, 128 previously supported by the conveyor 168.

In accordance with the preferred embodiment of the present invention, the tape applicator is manufactured by Star "V" Machinery Ltd., although other tape applying machines may be used without departing from the spirit of the present invention.

The bevel member 114 and the facing member 112 are taped along their respective decorative surfaces 120, 128 with the top surface 116 of the facing member 112 and the bottom surface 126 of the bevel member 114 secured together to form a complete molding preform ready for further processing. The applied tape 179 maintains proper alignment between the bevel member 114 and the facing member 112 as the bevel member 114 is rotated to meet the facing member 112 in the manner discussed below in greater detail.

The molding preform exiting the taping assembly 106 should be composed of the facing member 112 and the bevel member 114 in an entirely aligned configuration. That is, the seam 180 formed between the facing and bevel members 112, 114 along their decorative surfaces 120, 128 should be flush and minimally noticeable, while the ends of the facing and bevel members 112, 114 should be fully aligned.

The molding preform exits the taping assembly 106 and is conveyed along a short section 196 to the V-groove cutting assembly 108. The short conveyor section 196 includes a plurality of opposed guide rollers 170 on opposite sides. As with the guide rollers discussed above, the guide rollers 170 properly orient the molding preform prior to entering the V-groove cutting assembly 108 and may be readily adjusted to accommodate various sized facing and bevel members.

Figure 16:
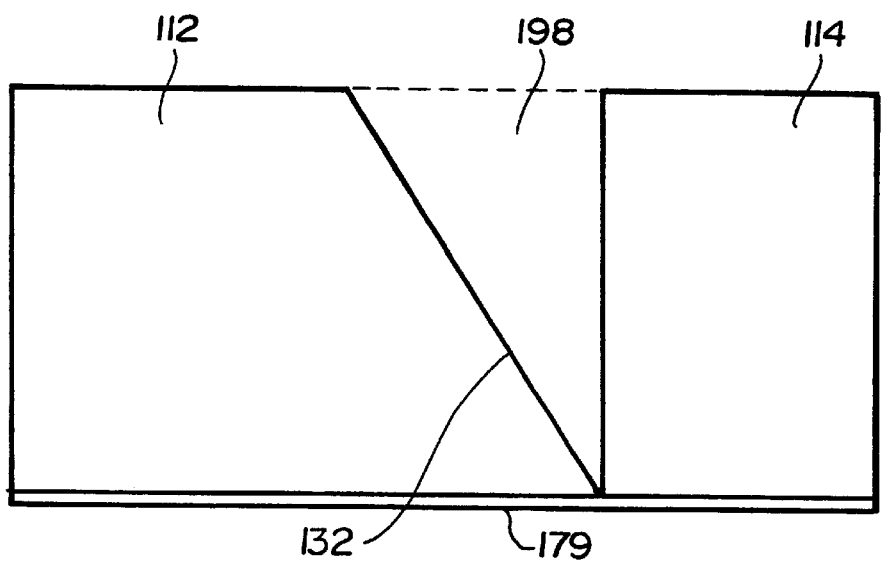
FIG. 16 is a cross-sectional view of the molding preform after passing through the V-groove cutting assembly.
Figure 17:
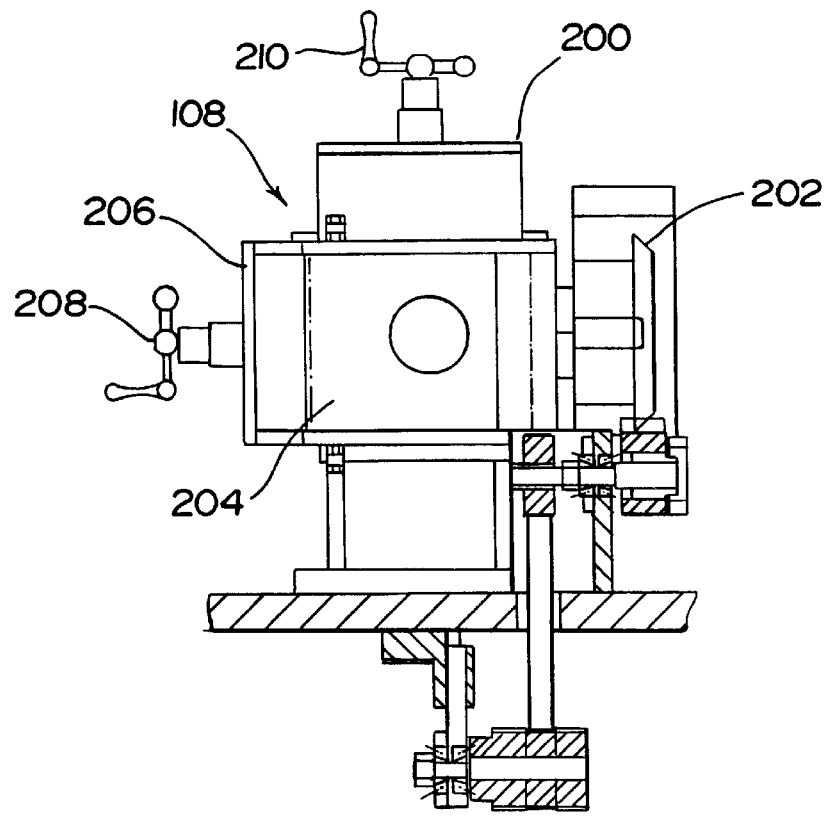
FIG. 17 is a cross-sectional view along the line XVII—XVII in FIG. 10.

The V-groove cutting assembly 108 cuts off the top portion 198 of the facing member 112 at approximately a 45° angle to facilitate the proper orientation of the bevel member 114 for final processing (see FIG. 16). The top portion 198 of the facing member 112 is cut such that the resulting angled top surface 132 of the facing member 112 is substantially beveled as it extends from the top edge of the decorative surface 120 to the top edge of the backside 122. While the top portion 198 is cut at a 45° angle in accordance with the preferred embodiment of the present invention, those skilled in the art will appreciate that the top surface 132 of the facing member 112 may be cut at various angles without departing from the spirit of the present invention.

The V-groove cutting assembly 108 includes a housing 200 in which a cutting element 202 is supported. The cutting element 202 is a substantially cylindrical member with a plurality of outwardly extending blades shaped and dimensioned to engage the surface of the facing member 112 as it passes therethrough and cut the top portion 198 of the facing member 112 to create a groove between the facing member 112 and the bevel member 114. The cutting element 202 is powered by a motor 204 supported within a cutting housing 206. The cutting housing 206 includes a horizontal adjustment mechanism 208 and a vertical adjustment mechanism 210 permitting ready adjustment of the cutting element 202 to ensure proper cutting of the groove between the facing member 112 and the bevel member 114 as they pass through the V-groove cutting assembly 108.

As with the previously discussed components of the present invention, the V-groove cutting assembly 108 moves the molding preform therethrough on a conveyor 168 controlled by the central control unit 148 linked to a series of sensors 146 which will be discussed in greater detail below.

Figure 18:
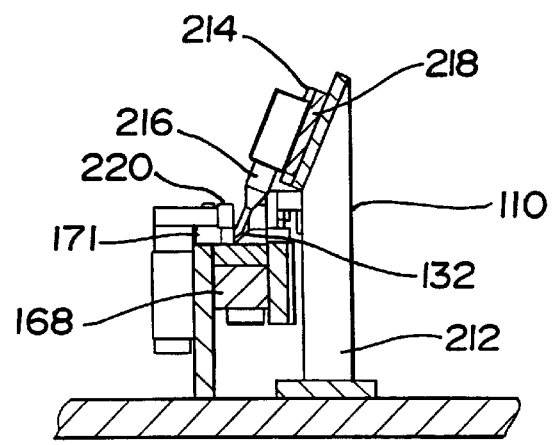
FIG. 18 is a cross-sectional view along the line XVIII—XVIII in FIG. 10.

The molding preform is then conveyed to the adhesive application station 110 shown in FIGS. 10, 11 and 18. The adhesive application station 110 includes a housing 212 and a portion of the conveyor 168 which moves the molding preform through the adhesive application station 110 in a controlled and predefined manner. An adhesive applicator 214 is mounted on the housing 212 of the adhesive application station 110 adjacent the conveyor system 168. The adhesive applicator 214 is shaped and dimensioned to apply a predetermined quantity of adhesive upon the angled top surface 132 of the facing member 112 when the molding preform passes thereby.

With this in mind, the adhesive applicator 214 includes a dispensing nozzle 216, a pump 218 and a source of adhesive (not shown). Those skilled in the art will appreciate the wide variety of adhesive applicators which may be used in accordance with the spirit of the present invention. Application of the adhesive is coordinated with the sensor 146 mounted on the adhesive application station 110 such that adhesive is only applied along the length of the molding preform.

Proper positioning of the molding preform as it passes through the adhesive application station 110 is ensured by the provision of lateral guide rollers 171 acting upon the top surface 124 of the bevel member 114 and the bottom surface 118 of the facing member 112, as well as upper rollers 220 respectively acting upon the backsides 122, 130 of both the bevel member 114 and the facing member 112.

The molding preform is now ready for folding of the bevel member 114 onto the top surface 116 of the facing member 112 and sealing thereon. As such, the molding preform is conveyed to the folding station 111 as shown in FIGS. 19, 20, 21a–d and 22. The folding station 111 includes a housing 222 which is slightly larger than the length of the molding being fabricated. The housing 222 includes an inlet 224 aligned with the outlet 228 of the adhesive application station 110 and an outlet 226 which is substantially transverse to the path of the molding as it enters the folding station 111.

In accordance with the preferred embodiment of the present invention, a plexiglass wall 230 extending upwardly from the base member 232 defines the outer boundaries of the housing 222. The plexiglass wall 230 protects the machinery held therein, while also protecting operators who may be working around the folding station 111. The inlet 224 and outlet 226 of the housing 222 are defined by openings formed in the wall 230 which permit the free passage of molding preforms and molding into and out of the folding station 111.

The folding station 111 includes a series of support arms 234 upon which the molding preform rests as it is conveyed from the adhesive application station 110 to the folding station 111. Proper positioning of the molding preform as it enters the folding station 111 is ensured by cutout sections 236 formed in each of the support arms 234. Each cutout section 236 is shaped slightly larger than the molding preform passing therethrough. In this way, the cutout sections 236 are shaped to receive, support and align the molding preforms as they enter the folding station 111.

Figure 21A:
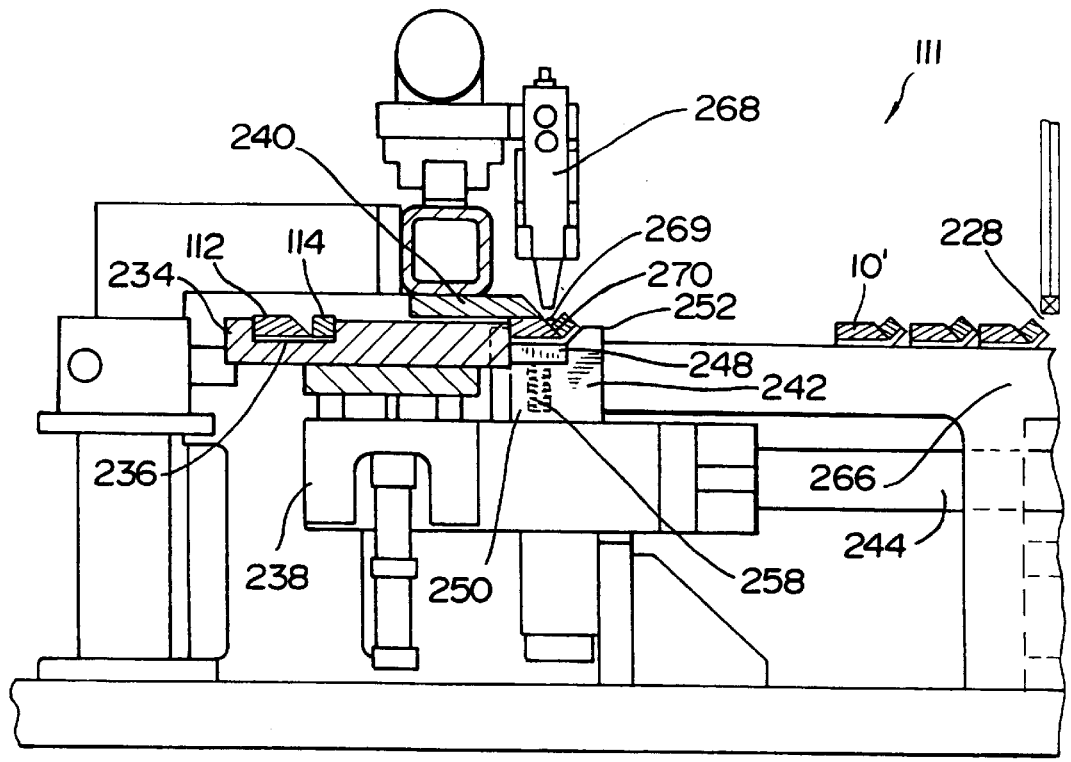
FIGS. 21a–21d are cross-sectional views along the line XXI—XXI in FIG. 19 showing the operation of the folding station.
Figure 21B:
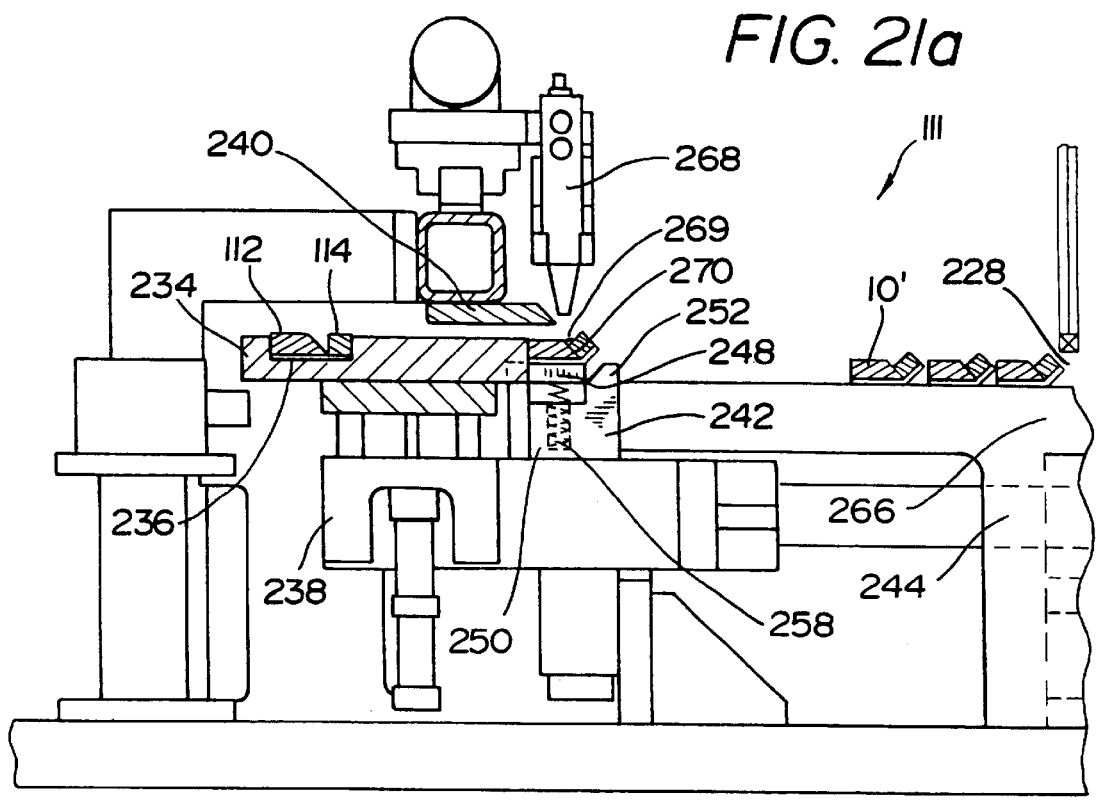
Figure 21C:
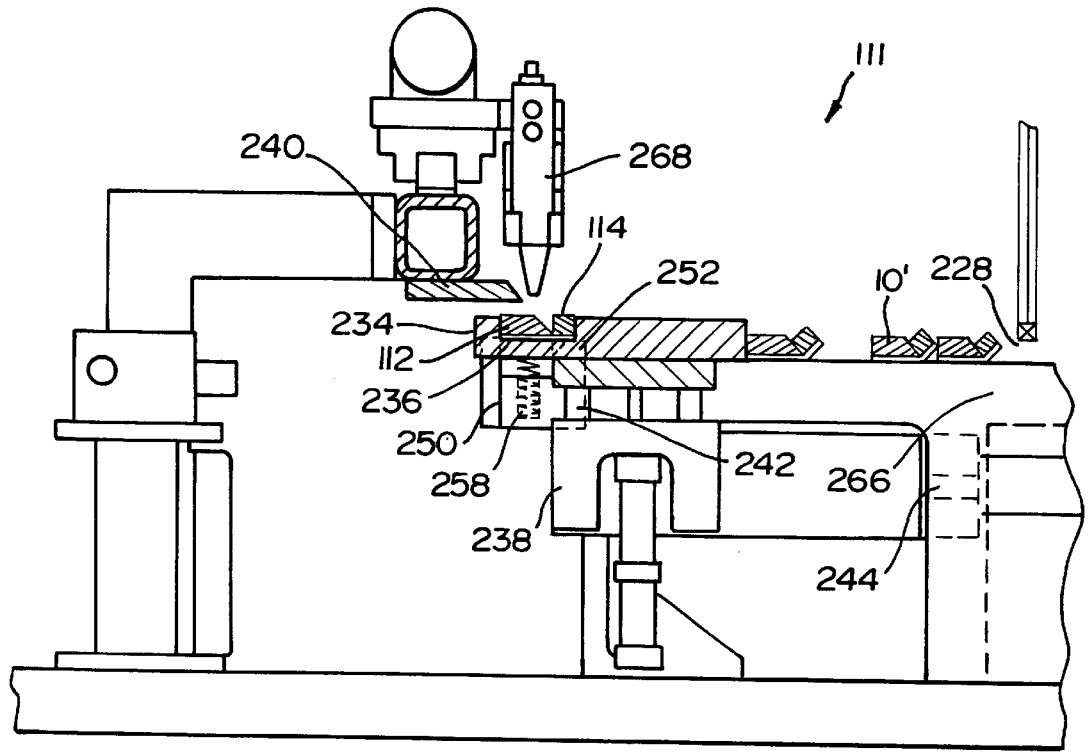
Figure 21D:
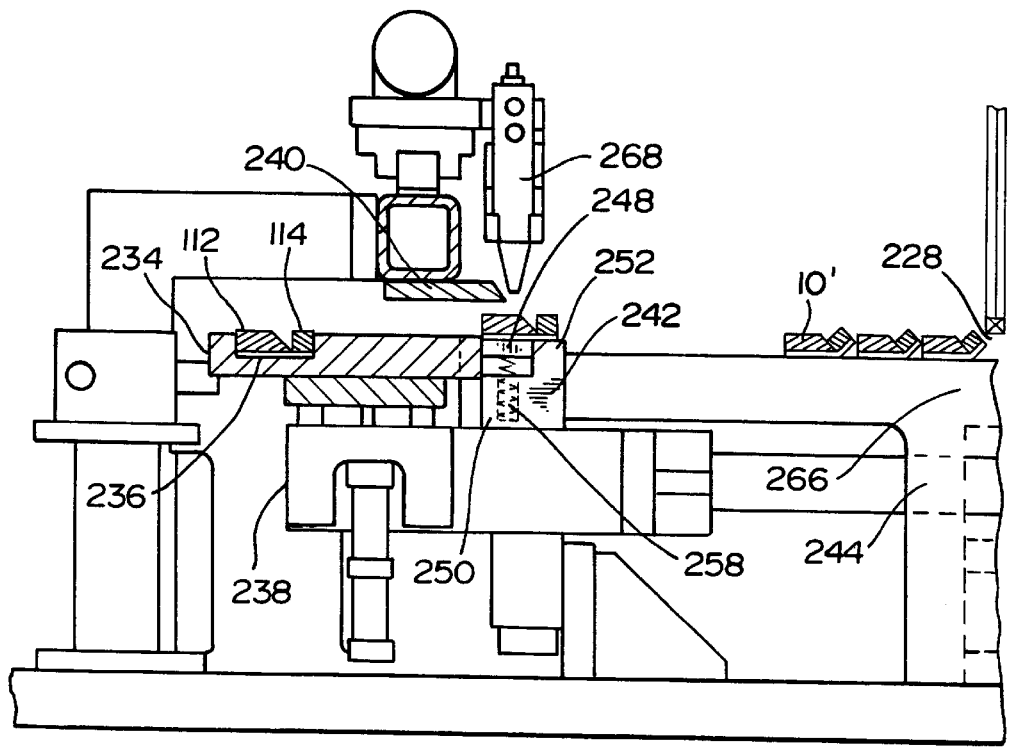

A slide 238 is mounted within the housing 222, and coupled to the support arms 234, for initiating lateral movement of the support arms 234 between their rear receiving position (see FIGS. 21a and 21d) and a forward delivery position adjacent the press assembly 240 and the folding supports 242 (see FIG. 21c). The slide 238 is pneumatically powered by pistons 244 to initiate forward and rearward movement of the support arms 234. While a pneumatic control system is used in accordance with the preferred embodiment of the present invention, alternate power systems may be used without departing from the spirit of the present invention.

The folding supports 242 are stationary. Each folding support 242 includes a support surface 246 shaped and dimensioned to support the molding preform and rotate the bevel member 114 into engagement with the top surface 116 of the facing member 112 (having adhesive thereon). Specifically, the support surface 246 is composed of a flat support plate 248 resiliently biased upon a support frame 250 of the folding support 242 and an angled member 252 positioned adjacent the flat support plate 248. A rear support plate 254 is located opposite the angled member 252 and is designed to prevent rearward movement of the molding preform as the press assembly 240 applies downward pressure.

The folding support 242 is shaped and dimensioned to provide a cradle in which the molding preform may sit as pressure is applied from above. With this in mind, the angled member provides an angled support surface 256 upon which the bevel member 114 may sit while the press assembly 240 applies downward pressure on the backside 122 of the facing member 112. The angled support surface 256 is oriented at substantially the same angle as the desired final orientation between the facing member 112 and the bevel member 114.

Figure 22:
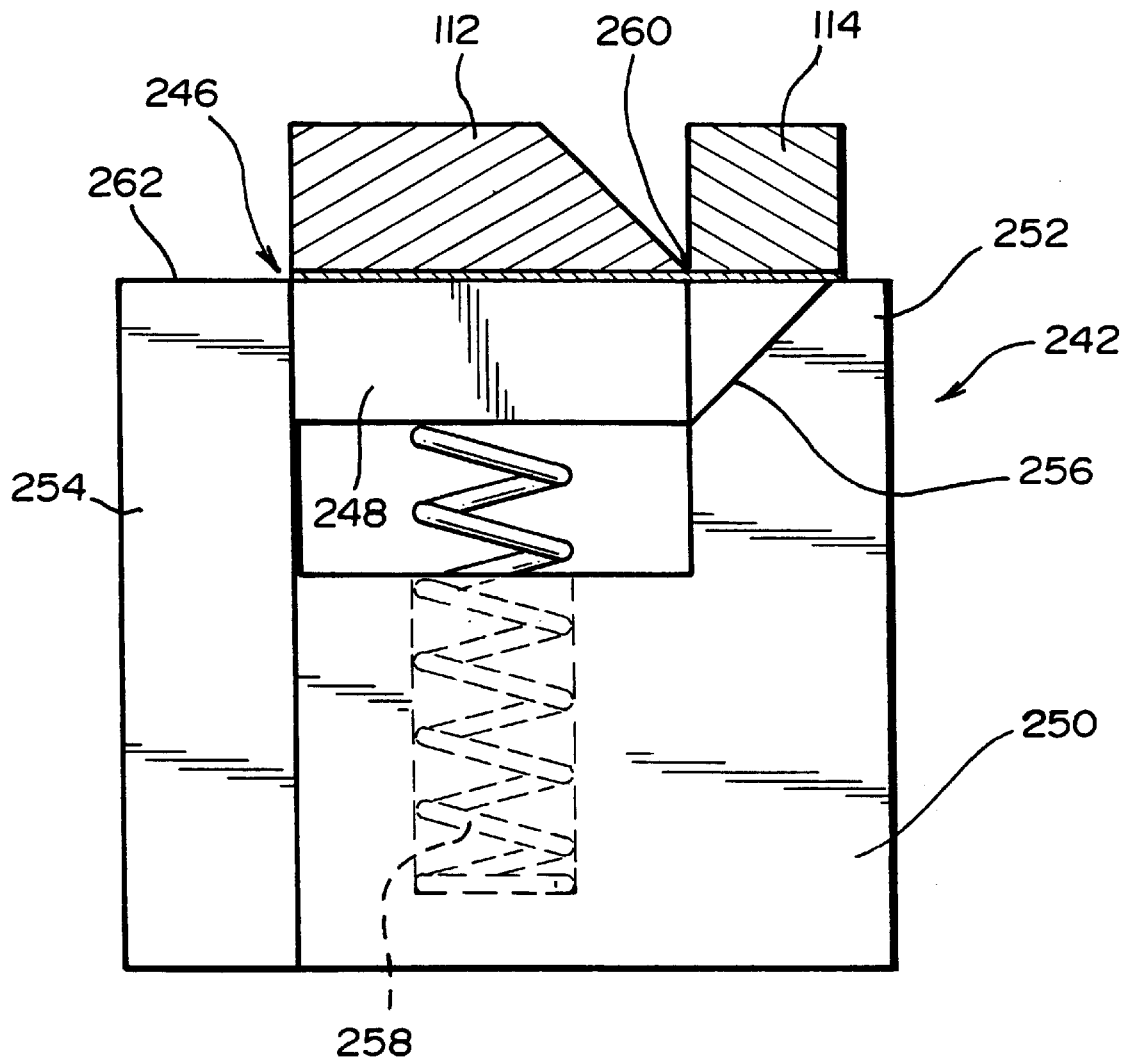
FIG. 22 is a cross-sectional view of the folding support with the flat support plate uncompressed.

As the press assembly 240 applies downward pressure under the control of a pneumatic power plant (not shown), the flat support plate 248, and similarly the facing member 112, move downwardly against the bias of the spring 258 positioned between the flat support plate 248 and the support frame 250. (See FIG. 22 showing a detail view of the preform and support surface 246 prior to compression.) As the facing member moves down under the pressure of the press assembly 240, the bevel member 114 is supported by the angled member 252 and rotates along the pivot 260 created by the tape 179 connecting the facing member 112 to the bevel member 114. Downward movement of the facing member 112 is continued until the facing member 112 and bevel member 114 are properly aligned under the control of the cradle created by the folding support 242 (see molding 10' as fully compressed in FIG. 21a).

In use, and assuming a piece of molding 10' has just been folded under the control of the press assembly 240 and folding supports 242 (see FIG. 21a), the press assembly 240 is first lifted upwardly to facilitate the release of the just prepared piece of molding (see FIG. 21b). With the release of the molding 10', the flat support plate 248 moves upwardly under the pressure of the spring 258 and the molding 10' is raised to approximately the level of the top surface 262 of the angled member 252.

The slide 238 is then actuated and the support arms 234 are raised to a height where the molding preform will pass over the top of the rear support plate 254. The slide 238 then moves the support arms 234 forward until the molding preform is properly aligned with the folding supports 242; that is, the facing member 112 is aligned with the flat support plate 248 and the bevel member 114 is aligned with the angled member 252 (see FIG. 21c).

As shown in FIG. 21c, forward movement of the support arms 234 also pushes the previously formed piece of molding 10' from the folding supports 242. Specifically, as the support arms 234 move forward under the control of the slide 238, the forward ends 264 of the support arms 234 contact the piece of molding 10' sitting on the folding supports 242. The support arms 234 continue to move forward and push the piece of molding 10' from the folding supports 242 and onto the outlet assembly 266.

Once the molding preform is properly aligned, the support arms 234 are lowered, placing the molding preform on the folding supports 242. The support arms 234 are further lowered to provide clearance for the cutout sections 236 such that the support arms 234 may be moved rearwardly without contacting the molding preform which has just been laid upon the folding supports 242. At this time, the support arms 234 move rearwardly to their rearward receiving position, and the molding preform sits upon the folding supports 242 (see FIG. 21d). The press assembly 240 then moves downwardly (return to FIG. 21a).

As discussed above, downward movement of the press assembly 240 causes the flat support plate 248, and similarly the facing member 112, to move downwardly against the bias of the spring 258 positioned between the flat support plate 248 and the support frame 250. As the facing member 112 moves down under the pressure of the press assembly 240, the bevel member 114 is supported by the angled member 252 and rotates along the pivot 260 created by the tape 179 connecting the facing member 112 to the bevel member 114. Downward movement of the facing member 112 is continued until the facing member 112 and bevel member 114 are properly aligned under the control of the cradle created by the folding supports 242.

When the bevel member 114 and the facing member 112 meet under the pressure of the press assembly 240 and the guidance of the folding supports 242, the press assembly 240 holds the molding preform in its folded position while hot adhesive guns 268 apply hot adhesive 269 to the joint 270 between the bevel member 114 and the facing member 112 along the backside of the molding preform. The hot adhesive temporarily holds the bevel member 114 and facing member 112 together with the bottom surface 126 of the bevel member 114 engaging the top surface 116 of the facing member 112 while the previously applied adhesive sets.

Once the hot adhesive sets (approximately 6 seconds), the cycle begins again and the support arms 238 push the just prepared piece of molding off the folding support and onto the outlet assembly where the assembled piece of molding may be retrieved by the operator of the line.

The assembled molding preform is then ready for final processing which includes cutting the backside of the molding preform as desired, cutting out the applied hot adhesive after the adhesive has been provided adequate time to set, and packaging for shipping.

An alternate embodiment of the present invention is also contemplated. The alternate embodiment uses the techniques disclosed above to fabricate a beveled molding from a single piece of material. This embodiment is especially appropriate where the desired molding includes a facing member and a bevel member with identical decorative surfaces.

In accordance with the embodiment, a single piece of material is inserted within the input of the guide conveyor which merely feeds the single piece of material to the squaring assembly. The single piece of material is shaped and dimensioned to be substantially identical to the cumulative shape and dimension of the molding preform discussed above. However, and as discussed above with regard to the prior embodiment, the piece may have slight size variations. It is, therefore, necessary to first feed the piece through the sizing machine.

The guide conveyor acts as a simple conveyor with alignment guides for ensuring proper positioning of the stock material as it enters the sizing machine. The components employed from the sizing machine to the folding station are identical with those discussed above in reference to the embodiment disclosed in FIGS. 1 to 22. As such, the following discussion relating to the operation of the alternate embodiment is shortened where further discussion would simply repeat operations discussed above with regard to FIGS. 1 to 22.

The conveyor elements of the sizing machine move the stock material through the sizing machine in much the same manner as the facing and bevel members are moved through the sizing machine. The sizing cutting assembly trims material from the backside of the stock material as necessary to create an appropriate thickness for further processing.

After exiting the sizing machine, the stock material is conveyed into the taping assembly where tape is applied along the decorative surface of the stock material at a position substantially where the delineation between the bevel surface and the facing surface will be created based upon subsequent processing in the V-groove cutting assembly. The applied tape maintains proper alignment between the bevel surface and the facing surface as the bevel surface is rotated to meet the facing surface in the manner discussed above in greater detail.

The molding preform is then conveyed to the V-groove cutting assembly where a groove is cut into the backside of the stock material. In essence, the cut groove creates a molding preform substantially identical to the molding preform formed in accordance with the system disclosed above with regard to FIGS. 1 to 22. With that in mind, the cutting member of the V-groove cutting assembly is shaped and dimensioned to cut a groove in the stock material which includes an angled first surface which is cut at approximately a 45° angle relative to the longitudinal plane of the backside of the stock material and an opposed second surface which is substantially perpendicular to the longitudinal plane of the backside of the stock material.

The groove is cut such that the first angled surface and the second angled surface meet at a point which is virtually at the exterior surface of the decorative layer. In this way, the V-groove cutting assembly creates a molding preform from a single stock piece of material which is substantially identical to the molding preform formed from the bevel member and the facing member discussed above with regard to the embodiment shown in FIGS. 1 to 22. With that in mind, the molding preform exiting the V-groove cutting assembly may be said to include a bevel member and a facing member, wherein the angled first surface is equivalent to the top surface of the facing member discussed above and the opposed second surface is equivalent to the bottom surface of the bevel member discussed above. While a 45° angle is cut in accordance with the preferred embodiment of the present invention, those skilled in the art will appreciate that the top surface of the facing member may be cut at various angles without departing from the spirit of the present invention.

The molding preform is then conveyed to the adhesive application station and folding station as discussed above.

As those skilled in the art will readily appreciate, a fabrication system with multiple stations as discussed above, employs a plurality of control sensors 146 to ensure proper operation of the line. The sensors 146 ensure that the molding pieces move through the system in a coordinated, controlled manner. For example, the sensors 146 monitor the passage of stock pieces through each station to ensure that stock pieces are not caught a specific station. Where the sensors 146 indicate a problem with one station, everything upstream of that station is shut down until the problem is remedied.

In addition, and in accordance with the two-piece embodiment, the sensors 146 ensure that the bevel member 114 and the facing member 112 move through the system in a coordinated manner. The coordinated movement of the bevel member 114 and the facing member 112 is especially critical until the members reach the taping assembly 106 where they are aligned and taped for further processing. If the facing and bevel members 112, 114 are taped while out of alignment, the resulting molding will be out of alignment and far from desirable.

As discussed above, the present system replaces the manually intensive techniques previously used for assembling molding. The present system provides for the complete fabrication of a two piece molding component by simply feeding one or two properly sized pieces of material into the feed assembly. The reduction in labor associated with the present system, as well as the improved consistency of the resulting molding, represents a substantial leap in technology associated with the assembly of multiple piece moldings.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A system for the fabrication of molding from stock material, comprising:

a groove cutting assembly for cutting a groove of predetermined shape and size in stock material to define a facing member and bevel member, wherein the groove is positioned between the facing member and the bevel member to define respectively opposed surfaces on the facing member and the bevel member;

an adhesive application station for applying adhesive within the groove formed by the groove cutting assembly;

a folding station for bringing the opposed surfaces of the facing member and the bevel member together;

means for conveying the stock material through the system; and wherein the stock material includes distinct facing members and bevel members, and the system further includes a squaring assembly for squaring the facing members and the bevel members fed into the system before the stock material is cut by the groove cutting assembly.

2. The system according to claim 1, further including a feed assembly in which stock material is fed into the system.

3. The system according to claim 1, further including a sizing machine for trimming the stock material to a desired thickness before the stock material is cut by the groove cutting assembly.

4. The system according to claim 1, wherein the groove cutting assembly cuts a V-shaped groove in the stock material.

5. The system according to claim 1, further including a taping station for taping a front surface of the stock material along a seam defining a line between the facing member and the bevel member.

6. The system according to claim 5, wherein the stock material includes distinct facing members and bevel members, and the taping station applies tape to the front surface of the facing member and the bevel member such that the facing member and the bevel member are securely retained together.

7. The system according to claim 1, wherein the stock material includes distinct facing members and bevel members, and the groove cutting assembly cuts a V-shaped groove between the facing member and the bevel member.

8. The system according to claim 7, wherein the groove is cut from a top portion of the facing member directly opposed to a bottom surface of the bevel member.

9. The system according to claim 8, wherein the groove cuts the top portion of the facing member such that the top surface of the facing member is at a 45° angle.

10. The system according to claim 1, wherein the folding station includes means for temporarily retaining the facing member and the bevel member folded together while the adhesive sets.

11. The system according to claim 10, wherein the means for temporarily retaining includes a hot adhesive gun applying hot adhesive along the joint between the facing member and the bevel member.

12. A system for the fabrication of molding from stock material, comprising:
   a groove cutting assembly for cutting a groove of predetermined shape and size in stock material to define a facing member and bevel member, wherein the groove is positioned between the facing member and the bevel member to define respectively opposed surfaces on the facing member and the bevel member;
   an adhesive application station for applying adhesive within the groove formed by the groove cutting assembly;
   a folding station for bringing the opposed surfaces of the facing member and the bevel member together;
   means for conveying the stock material through the system; and
   further including a taping station for taping a front surface of the stock material along a seam defining a line between the facing member and the bevel member.

13. The system according to claim 12, further including a feed assembly in which stock material is fed into the system.

14. The system according to claim 12, wherein the stock material includes distinct facing members and bevel members, and the system further includes a squaring assembly for squaring the facing members and the bevel members fed into the system before the stock material is cut by the groove cutting assembly.

15. The system according to claim 12, further including a sizing machine for trimming the stock material to a desired thickness before the stock material is cut by the groove cutting assembly.

16. The system according to claim 12, wherein the groove cutting assembly cuts a V-shaped groove in the stock material.

17. The system according to claim 12, wherein the stock material includes distinct facing members and bevel members, and the taping station applies tape to the front surface of the facing member and the bevel member such that the facing member and the bevel member are securely retained together.

18. The system according to claim 12, wherein the stock material includes distinct facing members and bevel members, and the groove cutting assembly cuts a V-shaped groove between the facing member and the bevel member.

19. The system according to claim 18, wherein the groove is cut from a top portion of the facing member directly opposed to a bottom surface of the bevel member.

20. The system according to claim 19, wherein the groove cuts the top portion of the facing member such that the top surface of the facing member is at a 45° angle.

21. The system according to claim 12, wherein the folding station includes means for temporarily retaining the facing member and the bevel member folded together while the adhesive sets.

22. The system according to claim 21, wherein the means for temporarily retaining includes a hot adhesive gun applying hot adhesive along the joint between the facing member and the bevel member.

23. A system for the fabrication of molding from stock material, comprising:
   a groove cutting assembly for cutting a groove of predetermined shape and size in stock material to define a facing member and bevel member, wherein the groove is positioned between the facing member and the bevel member to define respectively opposed surfaces on the facing member and the bevel member;
   an adhesive application station for applying adhesive within the groove formed by the groove cutting assembly;
   a folding station for bringing the opposed surfaces of the facing member and the bevel member together;
   means for conveying the stock material through the system; and
   wherein the stock material includes distinct facing members and bevel members, and the groove cutting assembly cuts a V-shaped groove between the facing member and the bevel member.

24. The system according to claim 23, further including a feed assembly in which stock material is fed into the system.

25. The system according to claim 23, wherein the stock material includes distinct facing members and bevel members, and the system further includes a squaring assembly for squaring the facing members and the bevel members fed into the system before the stock material is cut by the groove cutting assembly.

26. The system according to claim 23, further including a sizing machine for trimming the stock material to a desired thickness before the stock material is cut by the groove cutting assembly.

27. The system according to claim 23, wherein the groove cutting assembly cuts a V-shaped groove in the stock material.

28. The system according to claim 23, further including a taping station for taping a front surface of the stock material along a seam defining a line between the facing member and the bevel member, wherein the stock material includes distinct facing members and bevel members, and the taping station applies tape to the front surface of the facing member and the bevel member such that the facing member and the bevel member are securely retained together.

29. The system according to claim 23, wherein the groove is cut from a top portion of the facing member directly opposed to a bottom surface of the bevel member.

30. The system according to claim 29, wherein the groove cuts the top portion of the facing member such that the top surface of the facing member is at a 45° angle.

31. The system according to claim 23, wherein the folding station includes means for temporarily retaining the facing member and the bevel member folded together while the adhesive sets.

32. The system according to claim 31, wherein the means for temporarily retaining includes a hot adhesive gun applying hot adhesive along the joint between the facing member and the bevel member.

* * * * *